US012273696B2

(12) United States Patent
Boehm et al.

(10) Patent No.: US 12,273,696 B2
(45) Date of Patent: *Apr. 8, 2025

(54) METHOD AND DEVICE FOR APPLYING DYNAMIC RANGE COMPRESSION TO A HIGHER ORDER AMBISONICS SIGNAL

(71) Applicant: Dolby Laboratories Licensing Corporation, San Francisco, CA (US)

(72) Inventors: Johannes Boehm, Göttingen (DE); Florian Keiler, Hannover (DE)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/505,494

(22) Filed: Nov. 9, 2023

(65) Prior Publication Data

US 2024/0098436 A1 Mar. 21, 2024

Related U.S. Application Data

(60) Continuation of application No. 17/144,325, filed on Jan. 8, 2021, now Pat. No. 11,838,738, which is a (Continued)

(30) Foreign Application Priority Data

Mar. 24, 2014 (EP) .................................... 14305423
Apr. 15, 2014 (EP) .................................... 14305559

(51) Int. Cl.
*H04S 3/00* (2006.01)
*G10L 19/008* (2013.01)
*H04S 3/02* (2006.01)

(52) U.S. Cl.
CPC ............ *H04S 3/008* (2013.01); *G10L 19/008* (2013.01); *H04S 3/02* (2013.01); *H04S 2420/01* (2013.01); *H04S 2420/11* (2013.01)

(58) Field of Classification Search
CPC ... G10L 19/008; G10L 19/012; G10L 19/038; G10L 2021/02166; G10L 21/02;
(Continued)

(56) References Cited

U.S. PATENT DOCUMENTS 8,817,991 B2 * 8/2014 Jaillet .................... H04S 3/008 381/23
2002/0019733 A1 2/2002 Erell
(Continued)

FOREIGN PATENT DOCUMENTS

CN 1672177 A 9/2005
CN 1677490 A 10/2005
(Continued)

OTHER PUBLICATIONS

Dalian University of Technology Doctoral Dissertation "Research on Key Technologies in Multichannel Speech Signal Processing" Sound Field Reconstruction and Speech Separation, Feb. 2012.
(Continued)

*Primary Examiner* — Alexander Krzystan

(57) ABSTRACT

A method for performing DRC on a HOA signal comprises transforming the HOA signal to the spatial domain, analyzing the transformed HOA signal, and obtaining, from results of said analyzing, gain factors that are usable for dynamic compression. The gain factors can be transmitted together with the HOA signal. When applying the DRC, the HOA signal is transformed to the spatial domain, the gain factors are extracted and multiplied with the transformed HOA signal in the spatial domain, wherein a gain compensated transformed HOA signal is obtained. The gain compensated transformed HOA signal is transformed back into the HOA domain, wherein a gain compensated HOA signal is obtained. The DRC may be applied in the QMF-filter bank domain.

3 Claims, 5 Drawing Sheets

Related U.S. Application Data division of application No. 16/857,093, filed on Apr. 23, 2020, now Pat. No. 10,893,372, which is a division of application No. 16/660,626, filed on Oct. 22, 2019, now Pat. No. 10,638,244, which is a division of application No. 16/457,135, filed on Jun. 28, 2019, now Pat. No. 10,567,899, which is a division of application No. 15/891,326, filed on Feb. 7, 2018, now Pat. No. 10,362,424, which is a division of application No. 15/127,775, filed as application No. PCT/EP2015/056206 on Mar. 24, 2015, now Pat. No. 9,936,321.

(58) Field of Classification Search

CPC ........ H04S 2420/11; H04S 3/02; H04S 3/008; H04S 2420/03; H04S 2400/01; H04S 2400/11; H04S 2400/15; H04S 2420/01; H04S 5/005; H04S 7/303; H04R 2201/401; H04R 2430/21

USPC ................................ 700/94; 381/310, 22, 23

See application file for complete search history.

(56) References Cited

U.S. PATENT DOCUMENTS

| | | | | |
|---|---|---|---|---|
| 2004/0010329 | A1 | 1/2004 | Lee | |
| 2007/0177654 | A1 | 8/2007 | Levitine | |
| 2012/0155653 | A1 | 6/2012 | Jax et al. | |
| 2012/0307889 | A1 | 12/2012 | Kerofsky | |
| 2012/0310654 | A1 | 12/2012 | Riedmiller | |
| 2013/0158856 | A1 | 6/2013 | Xiang | |
| 2015/0163615 | A1 | 6/2015 | Boehm | |
| 2016/0104493 | A1* | 4/2016 | Kim | G10L 19/167 381/22 |
| 2016/0104494 | A1* | 4/2016 | Kim | G10L 19/167 381/23 |
| 2020/0012814 | A1 | 1/2020 | Brannon | |
| 2020/0112814 | A1* | 4/2020 | Kim | G06V 20/20 |

FOREIGN PATENT DOCUMENTS

| | | | |
|---|---|---|---|
| CN | 1677491 | A | 10/2005 |
| CN | 1677493 | A | 10/2005 |
| CN | 101243459 | B | 8/2008 |
| CN | 101421781 | A | 4/2009 |
| CN | 101460997 | A | 6/2009 |
| CN | 1848241 | B | 12/2010 |
| CN | 102265513 | B | 11/2011 |
| CN | 102171755 | B | 9/2012 |
| CN | 102884570 | B | 1/2013 |
| CN | 102576537 | B | 7/2014 |
| CN | 102682780 | B | 7/2014 |
| CN | 102576532 | B | 11/2015 |
| CN | 103250207 | B | 1/2016 |
| CN | 103635964 | B | 5/2016 |
| EP | 1629437 | A2 | 3/2006 |
| EP | 2665208 | A1 | 11/2013 |
| EP | 2688066 | A1 | 1/2014 |
| EP | 2690621 | A1 | 1/2014 |
| JP | 2011055204 | A | 3/2011 |
| JP | 2013-519918 | A | 5/2013 |
| JP | 2015-526759 | A | 9/2015 |
| RU | 2257676 | C2 | 7/2005 |
| RU | 2468451 | C1 | 11/2012 |
| RU | 2485605 | C2 | 6/2013 |
| TW | I224673 | B | 12/2004 |
| TW | 200822781 | A | 5/2008 |
| TW | 201346890 | A | 11/2013 |
| TW | 201411604 | A | 3/2014 |
| WO | 2004104930 | A2 | 12/2004 |
| WO | 2005027094 | A1 | 3/2005 |
| WO | 2005096273 | A1 | 10/2005 |
| WO | 2007021121 | A1 | 2/2007 |
| WO | 2012/059385 | A1 | 5/2012 |
| WO | 2013/006338 | A2 | 1/2013 |
| WO | 2013/171083 | A1 | 11/2013 |
| WO | 2013/176959 | A1 | 11/2013 |
| WO | 2013/181115 | A1 | 12/2013 |
| WO | 2014/012944 | A1 | 1/2014 |
| WO | 2014/012945 | A1 | 1/2014 |
| WO | 2014/013070 | A1 | 1/2014 |

OTHER PUBLICATIONS

Fliege, "Integration Nodes for the Sphere" last change: Sep. 19, 2007.

Fliege, Jorge "A Two-Stage Approach for Computing Cubature Formulae for the Sphere" pp. 1-31, 1996.

Hellerud, E. et al."Encoding Higher Order Ambisonics with AAC" AES presented at the 124th Convention, May 17-20, 2008, Amsterdam, The Netherlands, pp. 1-8.

ISO/IEC JTC1/SC29/WG11 "WD1-HOA Text of MPEG-H 3D Audio" Jan. 2014, Coding of Moving Pictures and Audio, pp. 1-86.

Ruzanski, Evan P. "Effects of MP3 Encoding on the Sounds of Music" IEEE Mar./Apr. 2006, pp. 43-45.

Vanuytsel, G. et al "Efficient Hybrid Optimization of Fixed-Point Cascaded IIR Filter Coefficients" 19th IEEE Instrumentation and Measurement Technology Conference, May 21-23, 2002.

Wang, Jing "An Extension Method of Parametric Stereo Audio Coding Combined with ITU-T G.719 Codec" China Academic Journal Electronic Publishing House, Feb. 2014, vol. 34, No. 2.

ISO/IEC JTC1/SC29/WG11 N14264, Coding of Moving Pictures and Audio, "WD1-HOA Text of MPEG-H 3D Audio" Jan. 2014, p. 1-82, San Jose, California, 85 pages.

* cited by examiner

METHOD AND DEVICE FOR APPLYING DYNAMIC RANGE COMPRESSION TO A HIGHER ORDER AMBISONICS SIGNAL

CROSS REFERENCE TO RELATED APPLICATIONS

This application is a continuation of U.S. patent application Ser. No. 17/144,325, filed Jan. 8, 2021, which is a divisional of U.S. patent application Ser. No. 16/857,093, filed Apr. 23, 2020, now U.S. Pat. No. 10,893,372, which is a divisional of U.S. patent application Ser. No. 16/660,626, filed Oct. 22, 2019, now U.S. Pat. No. 10,638,244, which is a divisional of U.S. patent application Ser. No. 16/457,135, filed Jun. 28, 2019, now U.S. Pat. No. 10,567,899, which is a divisional of U.S. patent application Ser. No. 15/891,326, filed Feb. 7, 2018, now U.S. Pat. No. 10,362,424, which is a divisional of U.S. patent application Ser. No. 15/127,775, filed Sep. 20, 2016, now U.S. Pat. No. 9,936,321, which is the U.S. National Stage of International Application No. PCT/EP2015/056206, filed Mar. 24, 2015, which claims priority to European Application No. 14305559.8, filed Apr. 15, 2014 and European Patent Application No. 14305423.7, filed Mar. 24, 2014, each of which is incorporated by reference in its entirety.

FIELD OF THE INVENTION

This invention relates to a method and a device for performing Dynamic Range Compression (DRC) to an Ambisonics signal, and in particular to a Higher Order Ambisonics (HOA) signal.

BACKGROUND

The purpose of Dynamic Range Compression (DRC) is to reduce the dynamic range of an audio signal. A time-varying gain factor is applied to the audio signal. Typically, this gain factor is dependent on the amplitude envelope of the signal used for controlling the gain. The mapping is in general non-linear. Large amplitudes are mapped to smaller ones while faint sounds are often amplified. Scenarios are noisy environments, late night listening, small speakers or mobile headphone listening.

A common concept for streaming or broadcasting Audio is to generate the DRC gains before transmission and apply these gains after receiving and decoding. The principle of using DRC, i.e. how DRC is usually applied to an audio signal, is shown in FIG. 1A. The signal level, usually the signal envelope, is detected, and a related time-varying gain gDRc is computed. The gain is used to change the amplitude of the audio signal. FIG. 1B shows the principle of using DRC for encoding/decoding, wherein gain factors are transmitted together with the coded audio signal. On the decoder side, the gains are applied to the decoded audio signal in order to reduce its dynamic range.

For 3D audio, different gains can be applied to loudspeaker channels that represent different spatial positions. These positions then need to be known at the sending side in order to be able to generate a matching set of gains. This is usually only possible for idealized conditions, while in realistic cases the number of speakers and their placement vary in many ways. This is more influenced from practical considerations than from specifications. Higher Order Ambisonics (HOA) is an audio format allows for flexible rendering. A HOA signal is composed of coefficient channels that do not directly represent sound levels. Therefore, DRC cannot be simply applied to HOA based signals.

SUMMARY OF THE INVENTION

The present invention solves at least the problem of how DRC can be applied to HOA signals. A HOA signal is analyzed in order to obtain one or more gain coefficients. In one embodiment, at least two gain coefficients are obtained, and the analysis of the HOA signal comprises a transformation into the spatial domain (iDSHT). The one or more gain coefficients are transmitted together with the original HOA signal. A special indication can be transmitted to indicate if all gain coefficients are equal. This is the case in a so-called simplified mode, whereas at least two different gain coefficients are used in a non-simplified mode. At the decoder, the one or more gains can (but need not) be applied to the HOA signal. The user has a choice whether or not to apply the one or more gains. An advantage of the simplified mode is that it requires considerably less computations, since only one gain factor is used, and since the gain factor can be applied to the coefficient channels of the HOA signal directly in the HOA domain, so that the transform into the spatial domain and subsequent transform back into the HOA domain can be skipped. In the simplified mode, the gain factor is obtained by analysis of only the zeroth order coefficient channel of the HOA signal.

According to one embodiment of the invention, a method for performing DRC on a HOA signal comprises transforming the HOA signal to the spatial domain (by an inverse DSHT), analyzing the transformed HOA signal and obtaining, from results of said analyzing, gain factors that are usable for dynamic range compression. In further steps, the obtained gain factors are multiplied (in the spatial domain) with the transformed HOA signal, wherein a gain compressed transformed HOA signal is obtained. Finally, the gain compressed transformed HOA signal is transformed back into the HOA domain (by a DSHT), i.e. coefficient domain, wherein a gain compressed HOA signal is obtained.

Further, according to one embodiment of the invention, a method for performing DRC in a simplified mode on a HOA signal comprises analyzing the HOA signal and obtaining from results of said analyzing a gain factor that is usable for dynamic range compression. In further steps, upon evaluation of the indication, the obtained gain factor is multiplied with coefficient channels of the HOA signal (in the HOA domain), wherein a gain compressed HOA signal is obtained. Also upon evaluation of the indication, it can be determined that a transformation of the HOA signal can be skipped. The indication to indicate simplified mode, i.e. that only one gain factor is used, can be set implicitly, e.g. if only simplified mode can be used due to hardware or other restrictions, or explicitly, e.g. upon user selection of either simplified or non-simplified mode.

Further, according to one embodiment of the invention, a method for applying DRC gain factors to a HOA signal comprises receiving a HOA signal, an indication and gain factors, determining that the indication indicates non-simplified mode, transforming the HOA signal into the spatial domain (using an inverse DSHT), wherein a transformed HOA signal is obtained, multiplying the gain factors with the transformed HOA signal, wherein a dynamic range compressed transformed HOA signal is obtained, and transforming the dynamic range compressed transformed HOA signal back into the HOA domain (i.e. coefficient domain) (using a DSHT), wherein a dynamic range compressed HOA signal is obtained. The gain factors can be received together with the HOA signal or separately.

Further, according to one embodiment of the invention, a method for applying a DRC gain factor to a HOA signal comprises receiving a HOA signal, an indication and a gain factor, determining that the indication indicates simplified mode, and upon said determining multiplying the gain factor with the HOA signal, wherein a dynamic range compressed HOA signal is obtained. The gain factors can be received together with the HOA signal or separately.

In one embodiment, the invention provides a computer readable medium having executable instructions to cause a computer to perform a method for applying DRC gain factors to a HOA signal, comprising steps as described above.

In one embodiment, the invention provides a computer readable medium having executable instructions to cause a computer to perform a method for performing DRC on a HOA signal, comprising steps as described above.

In one embodiment methods, apparatus and computer readable medium may be configured to perform the following methods for dynamic range compression (DRC). The methods may apply DRC in a Quadrature Mirror Filter (QMF)-filter bank domain. This may include receiving a Higher Order Ambisonics (HOA) audio representation and a gain value g(n, m) corresponding to a time frequency tile (n, m) and applying the gain value and a Discrete Spherical Harmonics Transform (DSHT) matrix to the HOA audio representation. The gain value is applied based on $\check{w}_{DRC}(n, m)=\mathrm{diag}(g(n, m))\ \hat{w}_{DSHT}(n, m)$, where $\hat{w}_{DSHT}(n, m)$ is a vector of spatial channels for the time frequency tile (n, m), and n the vector $\hat{w}_{DSHT}(n, m)$ is determined based on an application of the DSHT matrix to HOA audio representation. The method may further combine the DSHT matrix and rendering to loudspeaker channels based on $w(n, m)=D\ D_{DSHT}^{-1}\ \check{w}_{DRC}(n, m)$, wherein $D_{DSHT}^{-1}$ is an inverse of the DSHT matrix and D is a HOA rendering matrix.

Advantageous embodiments of the invention are disclosed in the dependent claim, the following description and the figures.

BRIEF DESCRIPTION OF THE DRAWINGS

Exemplary embodiments of the invention are described with reference to the accompanying drawings.

DETAILED DESCRIPTION OF THE INVENTION

Figure 1A:
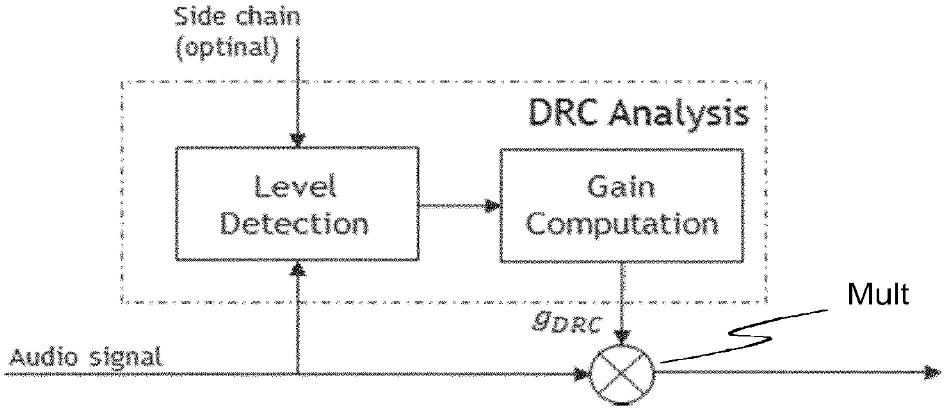
FIGS. 1A and 1B depict the general principle of DRC applied to audio.
Figure 1B:
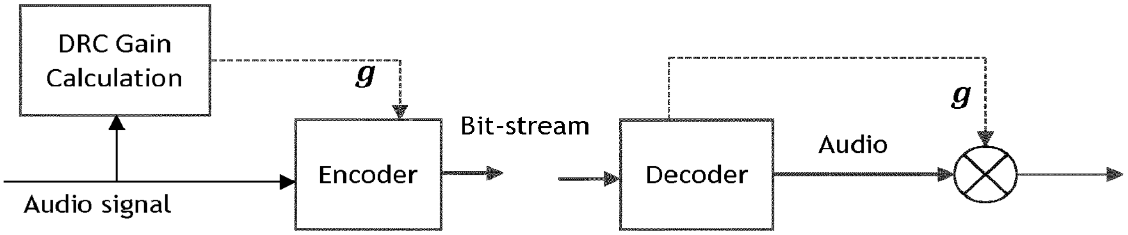
Figure 2A:
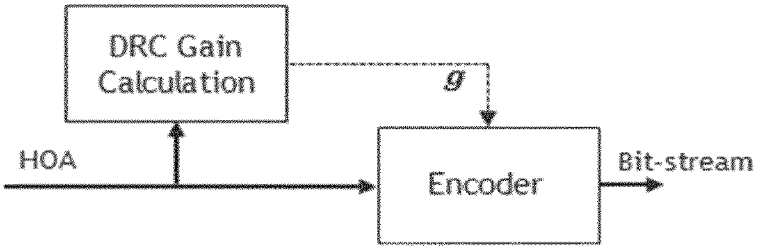
FIGS. 2A and 2B depict a general approach for applying DRC to HOA based signals according to the invention.

The present invention describes how DRC can be applied to HOA. This is conventionally not easy because HOA is a sound field description. FIG. 2 depicts the principle of the approach. On the encoding or transmitting side, as shown in FIG. 2A, HOA signals are analyzed, DRC gains g are calculated from the analysis of the HOA signal, and the DRC gains are coded and transmitted along with a coded representation of the HOA content. This may be a multiplexed bitstream or two or more separate bitstreams.

Figure 2B:
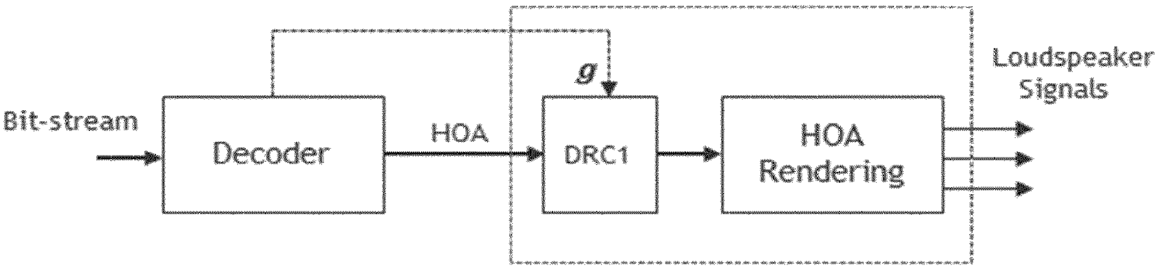

On the decoding or receiving side, as shown in FIG. 2B, the gains g are extracted from such bitstream or bitstreams. After decoding of the bitstream or bitstreams in a Decoder, the gains g are applied to the HOA signal as described below. By this, the gains are applied to the HOA signal, i.e. in general a dynamic range reduced HOA signal is obtained. Finally, the dynamic range adjusted HOA signal is rendered in a HOA renderer.

In the following, used assumptions and definitions are explained. Assumptions are that the HOA renderer is energy preserving, i.e. N3D normalized Spherical Harmonics are used, and the energy of a single directional signal coded inside the HOA representation is maintained after rendering. It is described e.g. in WO2015/007889A$_{(PD130040)}$ how to achieve this energy preserving HOA rendering.

Definitions of used terms are as follows.

$B \in \mathbb{R}^{(N+1)^2 \times \tau}$ denotes a block of τ HOA samples, B=[b(1), b(2), . . . , b(t), . . . , b(τ)], with vector $b(t)=[b_1, b_2, \ldots b_o, \ldots b_{N+1)^2}]^T=[B_0^0, B_1^{-1}, \ldots B_n^m, B_N^N,]^T$ which contains the Ambisonics coefficients in ACN order (vector index $o=n^2+n+m+1$, with coefficient order index n and coefficient degree index m). N denotes the HOA truncation order. The number of higher order coefficients in b is $(N+1)^2$. The sample index for one block of data is t. τ may range from usually one sample to 64 samples or more.

The zeroth order signal $\boldsymbol{b}_0=[b_1(1), b_1(2), \ldots, b_1(\tau)]$ is the first row of B. $D \in \mathbb{R}^{L \times (N+1)^2}$ denotes an energy preserving rendering matrix that renders a block of HOA samples to a block of L loudspeaker channel in spatial domain: W=DB, with $W \in \mathbb{R}^{L \times \tau}$. This is the assumed procedure of the HOA renderer in FIG. 2B (HOA rendering).

$D_L \in \mathbb{R}^{(N+1)^2 \times (N+1)^2}$ denotes a rendering matrix related to $L_L=(N+1)^2$ channels which are positioned on a sphere in a very regular manner, in a way that all neighboring positions share the same distance. $D_L$ is well-conditioned and its inverse $D_L^{-1}$ exists. Thus, both define a pair of transformation matrices (DSHT—Discrete Spherical Harmonics Transform):

$$W_L=D_L B, B=D_L^{-1} W_L$$

g is a vector of $L_L=(N+1)^2$ gain DRC values. Gain values are assumed to be applied to a block of τ samples and are assumed to be smooth from block to block. For transmission, gain values that share the same values can be combined to gain-groups. If only a single gain-group is used, this means that a single DRC gain value, here indicated by $g_1$, is applied to all speaker channel τ samples.

Figure 3:
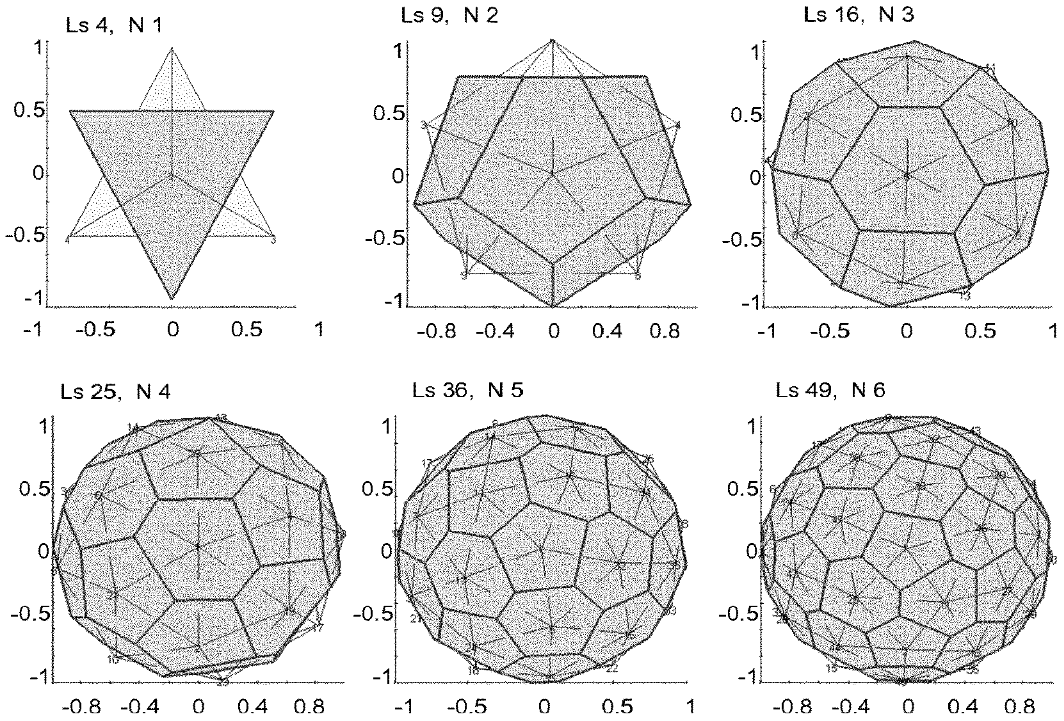
FIG. 3 depict spherical speaker grids for N=1 to N=6.

For every HOA truncation order N, an ideal $L_L=(N+1)^2$ virtual speaker grid and related rendering matrix $D_L$ are defined. The virtual speaker positions sample spatial areas surrounding a virtual listener. The grids for N=1 to 6 are shown in FIG. 3, where areas related to a speaker are shaded cells. One sampling position is always related to a central speaker position (azimuth=0, inclination=π/2; Note that azimuth is measured from frontal direction related to the listening position). The sampling positions, $D_L$, $D_L^{-1}$ are known at the encoder side when the DRC gains are created. At the decoder side, $D_L$ and $D_L^{-1}$ need to be known for applying the gain values.

Creation of DRC gains for HOA works as follows.

The HOA signal is converted to the spatial domain by $W_L=D_LB$. Up to $L_L=(N+1)^2$ DRC gains $g_l$ are created by analyzing these signals. If the content is a combination of HOA and Audio Objects (AO), AO signals such as e.g. dialog tracks may be used for side chaining. This is shown in FIG. 4B. When creating different DRC gain values related to different spatial areas, care needs to be taken that these gains do not influence the spatial image stability at the decoder side. To avoid this, a single gain may be assigned to all L channels, in the simplest case (so-called simplified mode). This can be done by analyzing all spatial signals W, or by analyzing the zeroth order HOA coefficient sample block ($\boldsymbol{b}_o$), and the transformation to the spatial domain is not needed (FIG. 4A). The latter is identical to analyzing the downmix signal of W. Further details are given below.

Figure 4:
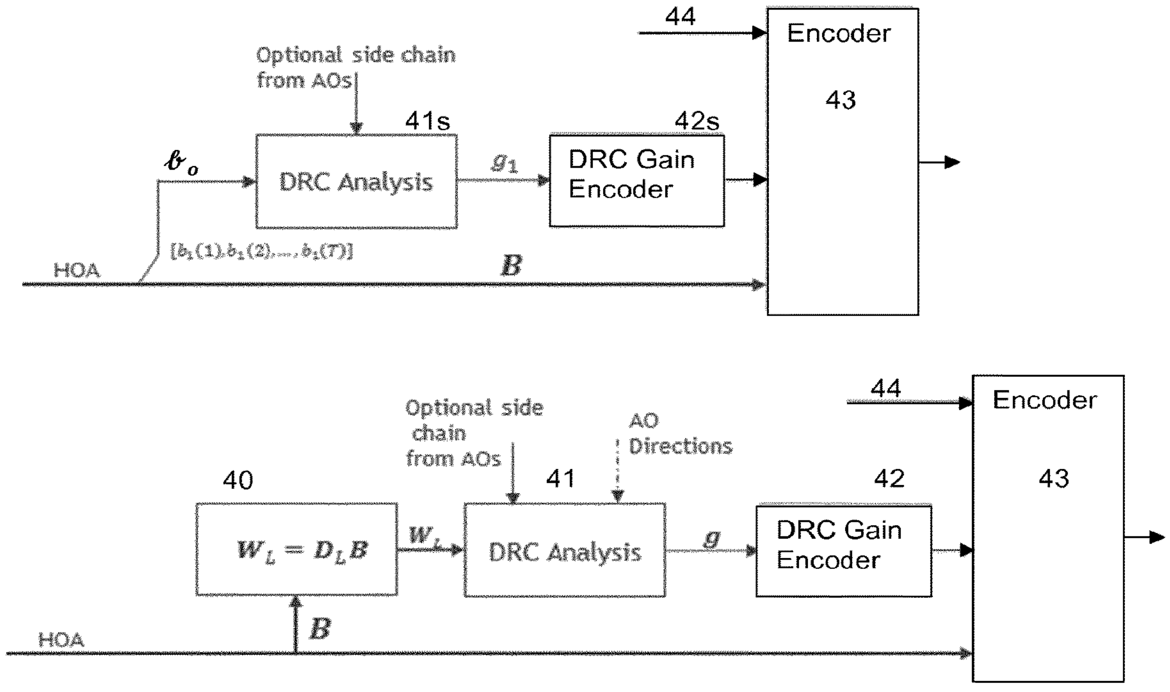
FIG. 4 depict creation of DRC gains for HOA.

In FIG. 4, creation of DRC gains for HOA is shown. FIG. 4A depicts how a single gain $g_1$ (for a single gain group) can be derived from the zeroth HOA order component $\boldsymbol{b}_o$ (optional with side chaining from AOs). The zeroth HOA order component $\boldsymbol{b}_0$ is analyzed in a DRC Analysis block 41*s* and the single gain $g_1$ is derived. The single gain $g_1$ is separately encoded in a DRC Gain Encoder 42*s*. The encoded gain is then encoded together with the HOA signal B in an encoder 43, which outputs an encoded bitstream. Optionally, further signals 44 can be included in the encoding. FIG. 4B depicts how two or more DRC gains are created by transforming 40 the HOA representation into a spatial domain. The transformed HOA signal $W_L$ is then analyzed in a DRC Analysis block 41 and gain values g are extracted and encoded in a DRC Gain Encoder 42. Also, here, the encoded gain is encoded together with the HOA signal B in an encoder 43, and optionally further signals 44 can be included in the encoding. As an example, sounds from the back (e.g. background sound) might get more attenuation than sounds originating from front and side directions. This would lead to $(N+1)^2$ gain values in g which could be transmitted within two gain groups for this example. Optional, it is also possible here to use side chaining by Audio Objects wave forms and their directional information. Side chaining means that DRC gains for a signal are obtained from another signal. This reduces the power of the HOA signal. Distracting sounds in the HOA mix sharing the same spatial source areas with the AO foreground sounds can get stronger attenuation gains than spatially distant sounds.

The gain values are transmitted to a receiver or decoder side.

A variable number of 1 to $L_L=(N+1)^2$ gain values related to a block of τ samples is transmitted. Gain values can be assigned to channel groups for transmission. In an embodiment, all equal gains are combined in one channel group to minimize transmission data. If a single gain is transmitted, it is related to all $L_L$ channels. Transmitted are the channel groups gain values $g_{l_g}$ and their number. The usage of channel groups is signaled, so that the receiver or decoder can apply the gain values correctly.

The gain values are applied as follows.

Figure 5A:
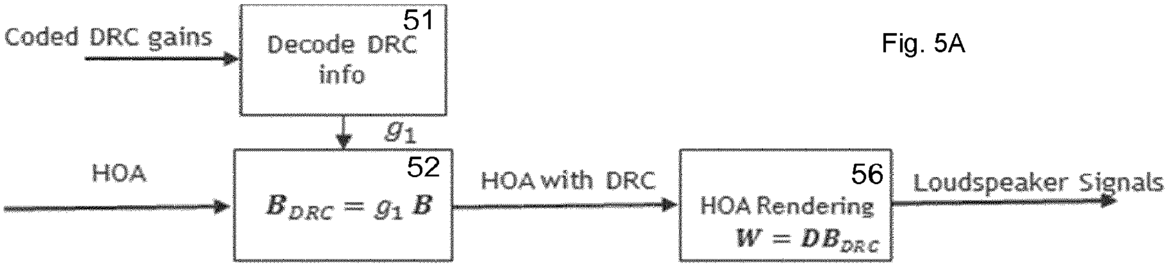
FIGS. 5A, 5B and 5C depict applying DRC to HOA signals.

The receiver/decoder can determine the number of transmitted coded gain values, decode 51 related information and assign 52-55 the gains to $L_L=(N+1)^2$ channels. If only one gain value (one channel group) is transmitted, it can be directly applied 52 to the HOA signal ($B_{DRC}=g_1$ B), as shown in FIG. 5A. This has an advantage because the decoding is much simpler and requires considerably less processing. The reason is that no matrix operations are required; instead, the gain values can be applied 52 directly, e.g. multiplied with the HOA coefficients. For further details see below. If two or more gains are transmitted, the channel group gains are assigned to L channel gains $g=[g_1, \ldots, g_L]$ each.

For the virtual regular loudspeaker grid, the loudspeaker signals with the DRC gains applied are computed by $$\hat{W}_L=\mathrm{diag}(g)\cdot W_L.$$

The resulting modified HOA representation is then computed by $$B_{DRC}=D_L^{-1}\hat{W}_L.$$

Figure 5B:
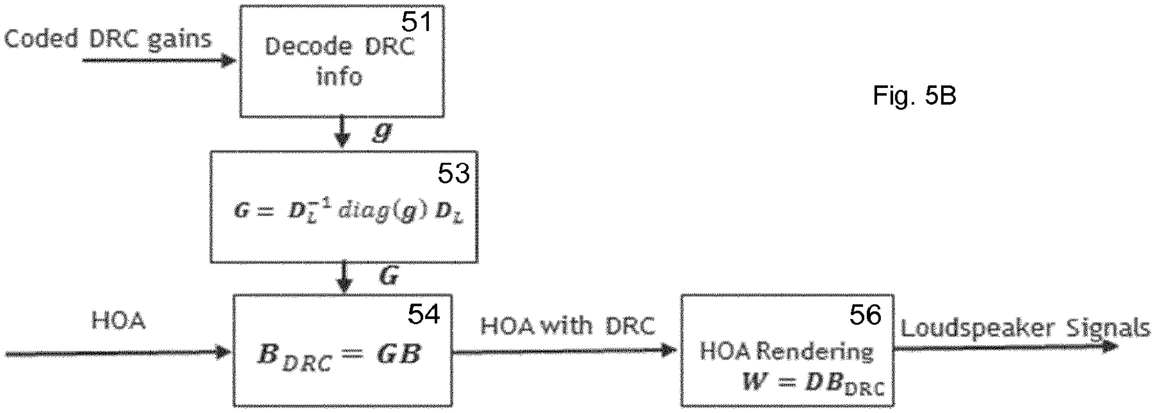

This can be simplified, as shown in FIG. 5B. Instead of transforming the HOA signal into the spatial domain, applying the gains and transforming the result back to the HOA domain, the gain vector is transformed 53 to the HOA domain by:

$$G=D_L^{-1}\,\mathrm{diag}(g)D_L,$$

with $\in\mathbb{R}^{(N+1)^2\times(N+1)^2}$. The gain matrix is applied directly to the HOA coefficients in a gain assignment block 54: $B_{DRC}=GB$.

This is more efficient in terms of computational operations needed for $(N+1)^2<\tau$. That is, this solution has an advantage over conventional solutions because the decoding is much simpler and requires considerably less processing. The reason is that no matrix operations are required; instead, the gain values can be applied directly, e.g. multiplied with the HOA coefficients in the gain assignment block 54.

Figure 5C:
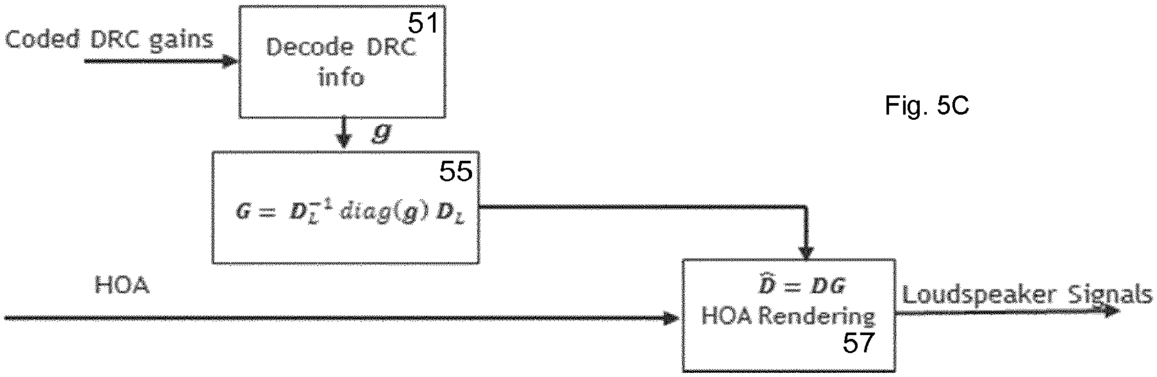

In one embodiment, an even more efficient way of applying the gain matrix is to manipulate in a Renderer matrix modification block 57 the Renderer matrix by $\hat{D}=DG$, apply the DRC and render the HOA signal in one step: $W=\hat{D}B$. This is shown in FIG. 5C. This is beneficial if $L<\tau$.

In summary, FIG. 5 shows various embodiments of applying DRC to HOA signals. In FIG. 5A, a single channel group gain is transmitted and decoded 51 and applied directly onto the HOA coefficients 52. Then, the HOA coefficients are rendered 56 using a normal rendering matrix.

In FIG. 5B, more than one channel group gains are transmitted and decoded 51. The decoding results in a gain vector g of $(N+1)^2$ gain values. A gain matrix G is created and applied 54 to a block of HOA samples. These are then rendered 56 by using a normal rendering matrix.

In FIG. 5C, instead of applying the decoded gain matrix/gain value to the HOA signal directly, it is applied directly onto the renderer's matrix. This is performed in the Renderer matrix modification block 57, and it is computationally beneficial if the DRC block size τ is larger than the number of output channels L. In this case, the HOA samples are rendered 57 by using a modified rendering matrix.

In the following, calculation of ideal DSHT (Discrete Spherical Harmonics Transform) matrices for DRC is described. Such DSHT matrices are particularly optimized for usage in DRC and are different from DSHT matrices used for other purpose, e.g. data rate compression.

The requirements for the ideal rendering and encoding matrices $D_L$ and $D_L^{-1}$ related to an ideal spherical layout are derived below. Finally, these requirements are the following:

(1) the rendering matrix $D_L$ must be invertible, that is, $D_L^{-1}$ needs to exist;

(2) the sum of amplitudes in the spatial domain should be reflected as the zeroth order HOA coefficients after spatial to HOA domain transform, and should be preserved after a subsequent transform to the spatial domain (amplitude requirement); and (3) the energy of the spatial signal should be preserved when transforming to the HOA domain and back to the spatial domain (energy preservation requirement).

Even for ideal rendering layouts, requirement 2 and 3 seem to be in contradiction to each other. When using a simple approach to derive the DSHT transform matrices, such as those known from the prior art, only one or the other of requirements (2) and (3) can be fulfilled without error. Fulfilling one of the requirements (2) and (3) without error results in errors exceeding 3 dB for the other one. This usually leads to audible artifacts. A method to overcome this problem is described in the following.

First, an ideal spherical layout with $L=(N+1)^2$ is selected. The L directions of the (virtual) speaker positions are given by $\Omega_l$ and the related mode matrix is denoted as $\Psi_L=[\varphi(\Omega_1), \ldots, \varphi(\Omega_l), \varphi(\Omega_L)]^T$. Each $\varphi(\Omega_l)$ is a mode vector containing the spherical harmonics of the direction $\Omega_L$. L quadrature gains related to the spherical layout positions are assembled in vector $\boldsymbol{q}$. These quadrature gains rate the spherical area around such positions and all sum up to a value of $4\pi$ related to the surface of a sphere with a radius of one.

A first prototype rendering matrix $\tilde{D}_L$ is derived by $$\tilde{D}_L = \text{diag}(q)\frac{\Psi_L}{L}.$$

Note that the division by L can be omitted due to a later normalization step (see below).

Second, a compact singular value decomposition is performed: $\tilde{D}_L=USV^T$ and a second prototype matrix is derived by $$\hat{\tilde{D}}_L=UV^T.$$

Third, the prototype matrix is normalized:

$$\check{D}_L = \frac{\hat{\tilde{D}}_L}{\|\hat{\tilde{D}}_L\|_k},$$

where k denotes the matrix norm type. Two matrix norm types show equally good performance. Either the k=1 norm or the Frobenius norm should be used. This matrix fulfills the requirement 3 (energy preservation).

Fourth, in the last step the Amplitude error to fulfill requirement 2 is substituted: Row-vector e is calculated by $$e = -\frac{1_L^T\check{D}_L - [1, 0, 0, \ldots, 0]}{L},$$

where $[1,0,0, \ldots, 0]$ is a row vector of $(N+1)^2$ all zero elements except for the first element with a value of one. $1_L^T\check{D}_L$ denotes the sum of rows vectors of $\check{D}_L$. The rendering matrix $D_L$ is now derived by substituting the amplitude error:

$$D_L=\check{D}_L+[e^T,e^T,e^T, \ldots]^T,$$

where vector e is added to every row of $\check{D}_L$. This matrix fulfills requirement 2 and requirement 3. The first row elements of $D_L^{-1}$ all become one.

In the following, detailed requirements for DRC are explained.

First, $L_L$ identical gains with a value of $g_1$ applied in spatial domain is equal to apply the gain $g_1$ to the HOA coefficients:

$$D_L^{-1}gW_L=D_L^{-1}g_1ID_LB=g_1D_L^{-1}D_LB=g_1B$$

This leads to the requirement: $D_L^{-1}D_L=I$, which means that $L=(N+1)^2$ and $D_L^{-1}$ needs to exist (trivial).

Second, analyzing the sum signal in spatial domain is equal to analyzing the zeroth order HOA component. DRC analyzers use the signals' energy as well as its amplitude. Thus, the sum signal is related to amplitude and energy.

The signal model of HOA: $B=\Psi_eX_s$, $X_s\in\mathbb{R}^{S\times\tau}$ is a matrix of S directional signals; $\Psi_e=[\varphi(\Omega_1), \ldots, \varphi(\Omega_s), \varphi(\Omega_S)]$ is a N3D mode matrix related to the directions $\Omega_1, \ldots, \Omega_s$. The mode vector $\varphi(\Omega_s)=[Y_0^0(\Omega_s), Y_1^{-1}(\Omega_s), \ldots Y_N^N(\Omega_s)]^T$ is assembled out of Spherical Harmonics. In N3D notation the zeroth order component $Y_0^0(\Omega_s)=1$ is independent of the direction.

The zeroth order component HOA signal needs to become the sum of the directional signals $\boldsymbol{b}_o=[b_1(1), b_1(2), \ldots, b_1(T)]=1_S^TX_s$ to reflect the correct amplitude of the summation signal. $1_S$ is a vector assembled out of S elements with a value of 1.

The energy of the directional signals is preserved in this mix because $\boldsymbol{b}_o\boldsymbol{b}_o^T=1_S^TX_sX_s^T1_S$. This would simplify to $\Sigma_{s=1}^S\Sigma_{t=1}^\tau X_{s,t}^2=\|X_s\|_{fro}^2$ if the signals $X_s$ are not correlated.

The sum of amplitudes in spatial domain is given by $1_L^TW_L=1_L^TD_L\Psi_eX_s=1_L^TM_LX_s$ with HOA panning matrix $M_L=D_L\Psi_e$.

This becomes $\boldsymbol{b}_o=1_S^TX_s$ for $1_L^TM_L=1_L^TD_L\Psi_e=1_S^T$. The latter requirement can be compared to the sum of amplitudes requirement sometimes used in panning like VBAP. Empirically it can be seen that this can be achieved in good approximation for very symmetric spherical speaker setups with $D_L=\Psi_e^{-1}$, because there we find: $1_L^TD_L\approx[1,0,0, \ldots, 0]\Rightarrow 1_L^TD_L\Psi_e\approx[Y_0^0(\Psi_1), \ldots Y_0^0(\Psi_s)]=\mathbf{1}_S^T$. The Amplitude requirement can then be reached within necessary accuracy.

This also ensures that the energy requirement for the sum signal can be met:

The energy sum in spatial domain is given by: $1_L^TW_LW_L^T1_L=1_L^TM_LX_sX_s^TM_L1_L$ which would become in good approximation $1_S^TX_sX_s^T1_S$, the existence of an ideal symmetric speaker setup required.

This leads to the requirement: $1_L^TD_L\cong[1,0,0, \ldots, 0]$ and in addition from the signal model we can conclude that the top row of $D_L^{-1}$ needs to be $[1,1,1,1, \ldots]$, i.e. a vector of length L with "one" elements) in order that the re-encoded order zero signal maintains amplitude and energy.

Third, energy preservation is a prerequisite: The energy of signal $x_s\in\mathbb{R}^{1\times\tau}$ should be preserved after conversion to HOA and spatial rendering to loud speakers independent of the signal's direction $\Omega_S$. This leads to $\|D_L\varphi(\Omega_s)\|_2^2=1$. This can be achieved by modelling $D_L$ from rotation matrices and a diagonal gain matrix: $D_L=UV^T\text{diag}(a)$ (the dependency on the direction $(\Omega_s)$ was removed for clarity): $\|D_L\varphi\|_2^2=\varphi^TD_L^TD_L\varphi=\varphi^T\text{diag}(a)VU^TUV^T\text{diag}(a)\varphi=\varphi^T\text{diag}(a)^2\varphi=\Sigma_{o=1}^{(N+1)^2}a_o^2\varphi_o^2\equiv 1$ For Spherical harmonics $\varphi_o^2=Y_n^{m^2}(\Omega_s)=1$, so all gains $a_o^2$ related to $\|D_L\|_{fro}^2=\Sigma_{o=1}^{(N+1)^2}a_o^2=1$ would satisfy the equation. If all gains are selected equal, this leads to $a_o^2=(N+1)^{-2}$.

The requirement $VV^T=1$ can be achieved for $L\geq(N+1)^2$ and only be approximated for $L<(N+1)^2$).

This leads to the requirement: $D_L^TD_L=\text{diag}(a)^2$ with $\Sigma_{o=1}^{(N+1)^2}a_o^2=1$.

As an example, a case with ideal spherical positions (for HOA orders N=1 to N=3) is described in the following (Tabs. 1-3). Ideal spherical positions for further HOA orders (N=4 to N=6) are described further below (Tabs. 4-6). All the below-mentioned positions are derived from modified positions published in [1]. The method to derive these positions and related quadrature/cubature gains was published in [2]. In these tables, the azimuth is measured counter-clockwise from frontal direction related to the listening position and the inclination is measured from the z-axis with an inclination of 0 being above the listening position.

TABLE 1 a) Spherical positions of virtual loudspeakers for HOA order N = 1, and b) resulting rendering matrix for spatial transform (DSHT)

a)
N = 1 Positions

| Spherical position $\Omega_l$ | | $q_l$ |
|---|---|---|
| Inclination θ/rad | Azimuth ϕ/rad | Quadrature gains |
| 0.33983655 | 3.14159265 | 3.14159271 |
| 1.57079667 | 0.00000000 | 3.14159267 |
| 2.06167886 | 1.95839324 | 3.14159262 |
| 2.06167892 | −1.95839316 | 3.14159262 |

b)
$D_L$:

| | | | |
|---|---|---|---|
| 0.2500 | −0.0000 | 0.4082 | −0.1443 |
| 0.2500 | 0.0000 | −0.0000 | 0.4330 |
| 0.2500 | 0.3536 | −0.2041 | −0.1443 |
| 0.2500 | −0.3536 | −0.2041 | −0.1443 |

TABLE 2 a) Spherical positions of virtual loudspeakers for HOA order N = 2 and b) resulting rendering matrix for spatial transform (DSHT)

a)
N = 2 Positions

| Spherical position $\Omega_l$ | | $q_l$ |
|---|---|---|
| Inclination θ/rad | Azimuth ϕ/rad | Quadrature gains |
| 1.57079633 | 0.00000000 | 1.41002219 |
| 2.35131567 | 3.14159265 | 1.36874571 |
| 1.21127801 | −1.18149779 | 1.36874584 |
| 1.21127606 | 1.18149755 | 1.36874598 |
| 1.31812905 | −2.45289512 | 1.41002213 |
| 0.00975782 | −0.00009218 | 1.41002214 |
| 1.31812792 | 2.45289621 | 1.41002230 |
| 2.41880319 | 1.19514740 | 1.41002223 |
| 2.41880555 | −1.19514441 | 1.41002209 |

b)
$D_L$:

| | | | | | | | | |
|---|---|---|---|---|---|---|---|---|
| 0.1117 | 0.0000 | 0.0067 | 0.2001 | 0.0000 | −0.0000 | −0.0931 | −0.0078 | 0.2235 |
| 0.1099 | −0.0000 | −0.1237 | −0.1249 | −0.0000 | 0.0000 | 0.0486 | 0.2399 | 0.0889 |
| 0.1099 | −0.1523 | 0.0619 | 0.0625 | −0.1278 | −0.1266 | −0.0850 | 0.0841 | −0.1455 |
| 0.1099 | 0.1523 | 0.0619 | 0.0625 | 0.1278 | 0.1266 | −0.0850 | 0.0841 | −0.1455 |
| 0.1117 | −0.1272 | 0.0450 | −0.1479 | 0.1938 | −0.0427 | −0.0898 | −0.1001 | 0.0350 |
| 0.1117 | −0.0000 | 0.2001 | 0.0086 | 0.0000 | −0.0000 | 0.2402 | −0.0040 | 0.0310 |
| 0.1117 | 0.1272 | 0.0450 | −0.1479 | −0.1938 | 0.0427 | −0.0898 | −0.1001 | 0.0350 |
| 0.1117 | 0.1272 | −0.1484 | 0.0436 | 0.0408 | −0.1942 | 0.0769 | −0.0982 | −0.0612 |
| 0.1117 | −0.1272 | −0.1484 | 0.0436 | −0.0408 | 0.1942 | 0.0769 | −0.0982 | −0.0612 |

TABLE 3 a): Spherical positions of virtual loudspeakers for HOA order N = 3
N = 3 Positions

| Spherical position $\Omega_l$ | | $q_l$ |
|---|---|---|
| Inclination θ/rad | Azimuth ϕ/rad | Quadrature gains |
| 0.49220083 | 0.00000000 | 0.75567412 |
| 1.12054210 | −0.87303924 | 0.75567398 |
| 2.52370429 | −0.05517088 | 0.75567401 |
| 2.49233024 | −2.15479457 | 0.87457076 |
| 1.57082248 | 0.00000000 | 0.87457075 |
| 2.02713647 | 1.01643753 | 0.75567388 |
| 1.61486095 | −2.60674413 | 0.75567396 |
| 2.02713675 | −1.01643766 | 0.75567398 |
| 1.08936018 | 2.89490077 | 0.75567412 |
| 1.18114721 | 0.89523032 | 0.75567399 |
| 0.65554353 | 1.89029902 | 0.75567382 |
| 1.60934762 | 1.91089719 | 0.87457082 |
| 2.68498672 | 2.02012831 | 0.75567392 |
| 1.46575084 | −1.76455426 | 0.75567402 |
| 0.58248614 | −2.22170415 | 0.87457060 |
| 2.00306837 | 2.81329239 | 0.75567389 |

TABLE 3 b)
$D_L$:

| | | | | | | | |
|---|---|---|---|---|---|---|---|
| 0.061457 | −0.000075 | 0.093499 | 0.050400 | −0.000027 | 0.000060 | 0.091035 | 0.098988 |
| 0.061457 | −0.073257 | 0.046432 | 0.061316 | −0.094748 | −0.071487 | −0.029426 | 0.059688 |
| 0.061457 | −0.003584 | −0.086661 | 0.061312 | −0.004319 | 0.006362 | 0.068273 | −0.111895 |
| 0.065628 | −0.057573 | −0.090918 | −0.038050 | 0.042921 | 0.102558 | 0.066570 | 0.067780 |
| 0.065628 | −0.000000 | −0.000003 | 0.114142 | −0.000000 | −0.000000 | −0.073690 | −0.000007 |
| 0.061457 | 0.081011 | −0.046687 | 0.050396 | 0.085735 | −0.079893 | −0.028706 | −0.049469 |
| 0.061457 | −0.054202 | −0.004471 | −0.091238 | 0.104013 | 0.005102 | −0.068089 | 0.008829 |
| 0.061457 | −0.080936 | −0.046816 | 0.050396 | −0.085707 | 0.079834 | −0.028795 | −0.049516 |
| 0.061457 | 0.023227 | 0.049179 | −0.091237 | −0.044356 | 0.023858 | −0.024641 | −0.094498 |
| 0.061457 | 0.076842 | 0.040224 | 0.061316 | 0.099067 | 0.065125 | −0.038969 | 0.052207 |
| 0.061457 | 0.061293 | 0.084298 | −0.020472 | −0.026210 | 0.108838 | 0.060891 | −0.036183 |
| 0.065628 | 0.107524 | −0.004399 | −0.038047 | −0.080156 | −0.009268 | −0.073361 | 0.003280 |
| 0.061457 | 0.042357 | −0.095230 | −0.020477 | −0.018235 | −0.084766 | 0.096995 | 0.040799 |
| 0.061457 | −0.103651 | 0.010933 | −0.020474 | 0.044445 | −0.024073 | −0.066259 | −0.004608 |
| 0.065628 | −0.049951 | 0.095320 | −0.038045 | 0.037235 | −0.093290 | 0.080481 | −0.071053 |
| 0.061457 | 0.030975 | −0.044701 | −0.091239 | −0.059658 | −0.028961 | −0.032307 | 0.085658 |
| 0.026750 | 0.019405 | 0.001461 | 0.003133 | 0.065741 | 0.124248 | 0.086602 | 0.029345 |
| −0.016892 | −0.055360 | −0.097812 | −0.010980 | −0.082425 | −0.007027 | −0.048502 | −0.080998 |
| 0.039506 | 0.008330 | 0.001142 | −0.027428 | −0.044323 | 0.125349 | −0.097700 | 0.021534 |
| −0.018289 | 0.008866 | −0.087449 | −0.104655 | −0.011720 | −0.061567 | 0.025778 | 0.023749 |
| 0.127634 | 0.002742 | 0.000000 | 0.010620 | 0.012464 | −0.093807 | 0.009642 | 0.121106 |
| −0.042390 | 0.016897 | −0.101358 | 0.003784 | 0.101201 | −0.012537 | 0.040833 | −0.076613 |
| 0.056943 | −0.149185 | 0.004553 | 0.050065 | 0.007556 | 0.060425 | −0.003395 | −0.002394 |
| −0.042442 | −0.030388 | 0.099898 | 0.015986 | 0.082103 | −0.014540 | 0.065488 | −0.078162 |
| 0.082023 | 0.072649 | 0.042376 | −0.007211 | −0.082403 | 0.008618 | 0.112746 | −0.042512 |
| −0.022402 | 0.028674 | 0.096668 | −0.032684 | −0.098253 | −0.008594 | −0.028068 | −0.082210 |
| −0.035381 | −0.026726 | −0.058661 | 0.111083 | 0.035312 | −0.053574 | −0.087737 | 0.014123 |
| −0.099081 | −0.064714 | 0.014164 | −0.085660 | −0.004839 | 0.038775 | 0.016889 | 0.101473 |
| −0.014532 | −0.025100 | 0.058531 | 0.110659 | −0.076710 | −0.053780 | 0.056883 | 0.013978 |
| −0.108789 | 0.127480 | 0.000140 | 0.071265 | −0.019816 | 0.026559 | −0.016573 | 0.076201 |
| −0.010264 | −0.018490 | 0.073275 | −0.097597 | 0.032029 | −0.080959 | −0.030699 | 0.008722 |
| 0.077606 | 0.084920 | 0.037824 | −0.010382 | 0.084083 | 0.002412 | −0.102187 | −0.047341 |

b): resulting rendering matrix for spatial transform (DSHT)

The term numerical quadrature is often abbreviated to quadrature and is quite a synonym for numerical integration, especially as applied to 1-dimensional integrals. Numerical integration over more than one dimension is called cubature herein.

Typical application scenarios to apply DRC gains to HOA signals are shown in FIG. 5, as described above. For mixed content applications, such as e.g. HOA plus Audio Objects, DRC gain application can be realized in at least two ways for flexible rendering.

Figure 6A:
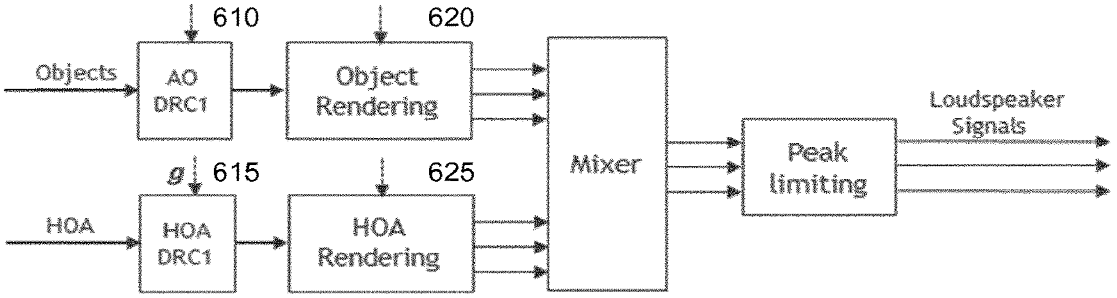
FIGS. 6A and 6B depict Dynamic Range Compression processing at the decoder side.
Figure 6B:
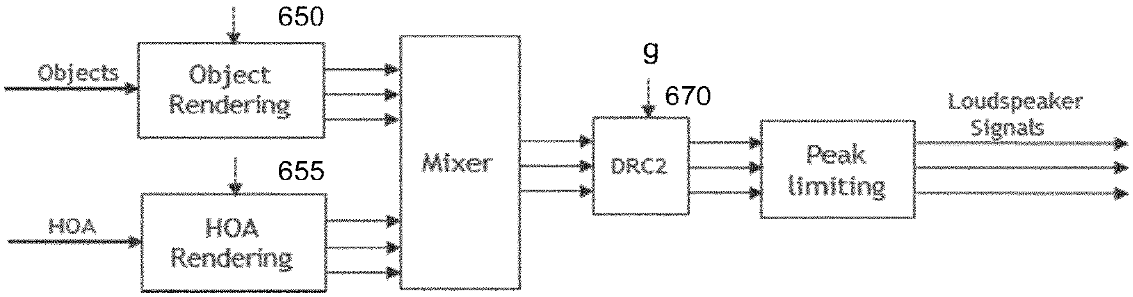

FIG. 6 shows exemplarily Dynamic Range Compression (DRC) processing at the decoder side. In FIG. 6A, DRC is applied before rendering 620, 625 and mixing. In FIG. 6B, DRC 670 is applied to the loudspeaker signals, i.e. after rendering 650, 655 and mixing.

In FIG. 6A, DRC gains are applied to Audio Objects and HOA separately: DRC gains are applied to Audio Objects in an Audio Object DRC block 610, and DRC gains are applied to HOA in a HOA DRC block 615. Here the realization of the block HOA DRC block 615 matches one of those in FIG. 5. In FIG. 6B, a single gain is applied to all channels of the mixture signal of the rendered HOA and rendered Audio Object signal. Here no spatial emphasis and attenuation is possible. The related DRC gain cannot be created by analyzing the sum signal of the rendered mix, because the speaker layout of the consumer site is not known at the time of creation at the broadcast or content creation site. The DRC gain can be derived analyzing $y_m \in \mathbb{R}^{1\times\tau}$ where $y_m$ is a mix of the zeroth order HOA signal $b_w$ and the mono downmix of S Audio Objects $x_s$:

$$y_m = \ell_o + \sum_{s=1}^{S} x_s.$$

In the following, further details of the disclosed solution are described.

DRC for HOA Content

DRC is applied to the HOA signal before rendering, or may be combined with rendering. DRC for HOA can be applied in the time domain or in the QMF-filter bank domain.

For DRC in the Time Domain, the DRC decoder provides $(N+1)^2$ gain values $g_{drc}=[g_1, \ldots, g_{(N+1)^2}]^T$ according to the number of HOA coefficient channels of the HOA signal c. N is the HOA order.

DRC gains are applied to the HOA signals according to:

$$c_{drc}=D_L^{-1}\,\mathrm{diag}(g_{drc})D_L c$$

where c is a vector of one time sample of HOA coefficients ($c\in\mathbb{R}^{(N+1)^2\times 1}$), and $D_L\in\mathbb{R}^{(N+1)^2\times(N+1)^2}$ and its inverse $D_L^{-1}$ are matrices related to a Discrete Spherical Harmonics Transform (DSHT) optimized for DRC purposes.

In one embodiment, it can be advantageous for decreasing the computational load by $(N+1)^4$ operations per sample, to include the rendering step and calculate the loudspeaker signals directly by: $w_{drc}=(D\,D_L^{-1})\,(\mathrm{diag}(g_{drc})D_L)c$, where D is the rendering matrix and $(D\,D_L^{-1})$ can be pre-computed.

If all gains $g_1, \ldots, g_{(N+1)^2}$ have the same value of $g_{drc}$, as in the simplified mode, a single gain group has been used to transmit the coder DRC gains. This case can be flagged by the DRC decoder, because in this case the calculation in the spatial filter is not needed, so that the calculation simplifies to:

$$c_{drc}=g_{drc}c.$$

The above describes how to obtain and apply the DRC gain values. In the following, the calculation of DSHT matrices for DRC is described.

In the following, $D_L$ is renamed to $D_{DSHT}$. The matrices to determine the spatial filter $D_{DSHT}$ and its inverse $D_{DSHT}^{-1}$ are calculated as follows:

A set of spherical positions $\mathfrak{O}_{DSHT}=[\Omega_1, \Omega_l, \ldots, \Omega_{(N+1)^2}]$ with $\Omega_l=[\theta_l, \phi_l]^T$ and related quadrature (cubature) gains $q \in \mathbb{R}^{(N+1)^2\times 1}$ are selected, indexed by the HOA order N from Tables 1-4. A mode matrix $\Psi_{DSHT}$ related to these positions is calculated as described above. That is, the mode matrix $\Psi_{DSHT}$ comprises mode vectors according to $\Psi_{DSHT}=[\varphi(\Omega_1), \ldots, \varphi(\Omega_l), \varphi(\Omega_{(N+1)^2})]$ with each $\varphi(\Omega_l)$ being a mode vector that contains spherical harmonics of a predefined direction $\Omega_l$ with $\Omega_l=[\theta_l, \phi_l]^T$. The predefined direction depends on the HOA order N, according to Tab. 1-6 (exemplarily for $1 \le N \le 6$). A first prototype matrix is calculated by $$\tilde{D}_1 = \mathrm{diag}(q)\frac{\Psi_{DSHT}^T}{(N+1)^2}$$

(the division by $(N+1)^2$ can be skipped due to a subsequent normalization). A compact singular value decomposition is performed $\tilde{D}_1=USV^T$ and a new prototype matrix is calculated by: $\hat{\hat{D}}_2=UV^T$. This matrix is normalized by:

$$\check{D}_2 = \frac{\hat{\hat{D}}_2}{\|\hat{\hat{D}}_2\|_{fro}}.$$

A row-vector e is calculated by $$e = -\frac{1_L^T\check{D}_2 - [1, 0, 0, \ldots, 0]}{(N+1)^2},$$

where $[1,0,0, \ldots ,0]$ is a row vector of $(N+1)^2$ all zero elements except for the first element with a value of one. $1_L^T\check{D}_2$ denotes the sum of rows of $\check{D}_2$. The optimized DSHT matrix $D_{DSHT}$ is now derived by: $D_{DSHT}=\check{D}_2+[e^T, e^T, e^T, \ldots]^T$. It has been found that, if $-e$ is used instead of e, the invention provides slightly worse but still usable results.

For DRC in the QMF-filter bank domain, the following applies.

The DRC decoder provides a gain value $g_{ch}$ (n, m) for every time frequency tile n, m for $(N+1)^2$ spatial channels. The gains for time slot n and frequency band m are arranged in $g(n, m) \in \mathbb{R}^{(N+1)^2\times 1}$.

Figure 7:
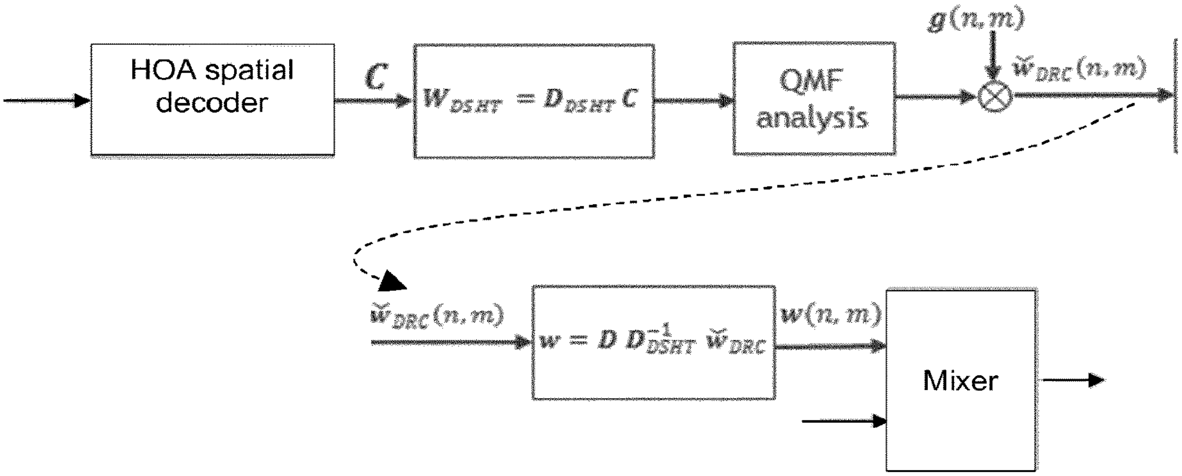
FIG. 7 depicts DRC for HOA in QMF domain combined with rendering step.

Multiband DRC is applied in the QMF Filter bank domain. The processing steps are shown in FIG. 7. The reconstructed HOA signal is transformed into the spatial domain by (inverse DSHT): $W_{DSHT}=D_{DSHT}C$, where $C \in \mathbb{R}^{(N+1)^2\times\tau}$ is a block of $\tau$ HOA samples and $W_{DSHT} \in \mathbb{R}^{(N+1)^2\times\tau}$ is a block of spatial samples matching the input time granularity of the QMF filter bank. Then the QMF analysis filter bank is applied. Let $\hat{w}_{DSHT}(n,m) \in \mathbb{C}^{(N+1)^2\times 1}$ denote a vector of spatial channels per time frequency tile (n, m). Then the DRC gains are applied: $\check{w}_{DRC}(n,m)=\mathrm{diag}(g(n, m))\hat{w}_{DSHT}(n, m)$.

To minimize the computational complexity, the DSHT and rendering to loudspeaker channels are combined: $w(n, m)=D\, D_{DSHT}^{-1}\, \check{w}_{DRC}(n, m)$, where D denotes the HOA rendering matrix. The QMF signals then can be fed to the mixer for further processing.

FIG. 7 shows DRC for HOA in the QMF domain combined with a rendering step.

If only a single gain group for DRC has been used this should be flagged by the DRC decoder because again computational simplifications are possible. In this case the gains in vector g(n, m) all share the same value of $g_{DRC}(n, m)$. The QMF filter bank can be directly applied to the HOA signal and the gain $g_{DRC}(n, m)$ can be multiplied in filter bank domain.

Figure 8:
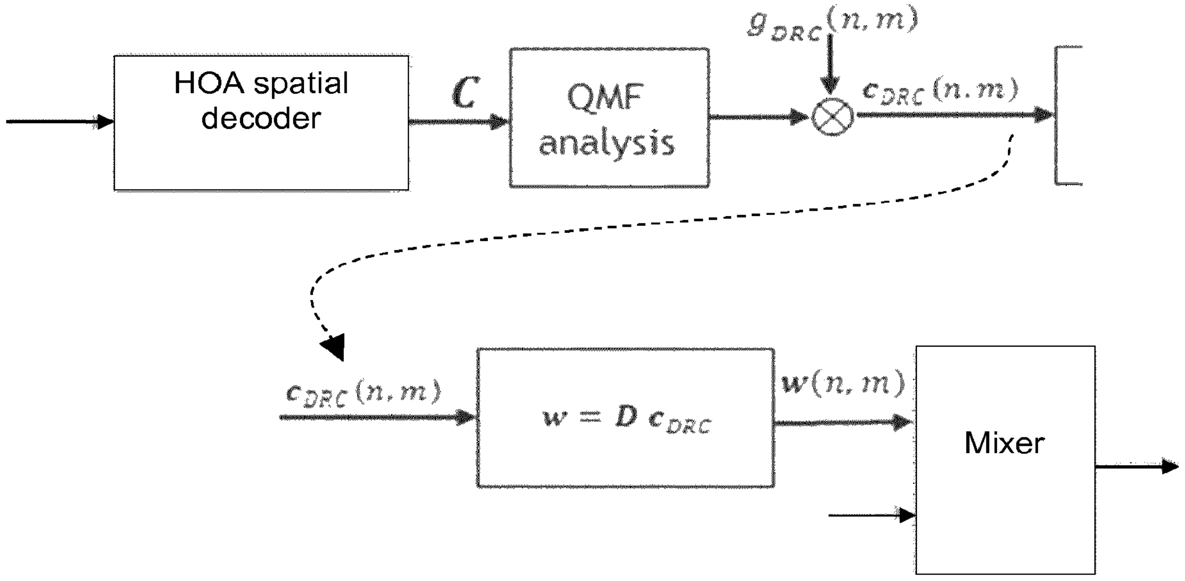
FIG. 8 depicts DRC for HOA in QMF domain combined with rendering step for the simple case of a single DRC gain group.

FIG. 8 shows DRC for HOA in the QMF domain (a filter domain of a Quadrature Mirror Filter) combined with a rendering step, with computational simplifications for the simple case of a single DRC gain group.

As has become apparent in view of the above, in one embodiment the invention relates to a method for applying Dynamic Range Compression gain factors to a HOA signal, the method comprising steps of receiving a HOA signal and one or more gain factors, transforming 40 the HOA signal into the spatial domain, wherein an iDSHT is used with a transform matrix obtained from spherical positions of virtual loudspeakers and quadrature gains q, and wherein a transformed HOA signal is obtained, multiplying the gain factors with the transformed HOA signal, wherein a dynamic range compressed transformed HOA signal is obtained, and transforming the dynamic range compressed transformed HOA signal back into the HOA domain being a coefficient domain and using a Discrete Spherical Harmonics Transform (DSHT), wherein a dynamic range compressed HOA signal is obtained.

Further, the transform matrix is computed according to $D_{DSHT}=\check{D}_2+[e^T, e^T, e^T, \ldots]^T$ wherein $$\check{D}_2 = \frac{\hat{D}_2}{\|\hat{D}_2\|_{fro}}$$

is a normalized version of $\hat{\hat{D}}_2=UV^T$ with U,V obtained from $$\tilde{D}_1 = USV^T = \mathrm{diag}(q)\frac{\Psi_{DSHT}}{(N+1)^2},$$

with $\Psi_{DSHT}$ being the transposed mode matrix of spherical harmonics related to the used spherical positions of virtual loudspeakers, and $e^T$ being a transposed version of $$e = -\frac{1_L^T\check{D}_2 - [1, 0, 0, \ldots, 0]}{(N+1)^2}.$$

Further, in one embodiment the invention relates to a device for applying DRC gain factors to a HOA signal, the device comprising a processor or one or more processing elements adapted for receiving a HOA signal and one or more gain factors, transforming 40 the HOA signal into the spatial domain, wherein an iDSHT is used with a transform matrix obtained from spherical positions of virtual loudspeakers and quadrature gains q, and wherein a transformed HOA signal is obtained, multiplying the gain factors with the transformed HOA signal, wherein a dynamic range compressed transformed HOA signal is obtained, and transforming the dynamic range compressed transformed HOA signal back into the HOA domain being a coefficient domain and using a Discrete Spherical Harmonics Transform (DSHT), wherein a dynamic range compressed HOA signal is obtained. Further, the transform matrix is computed according to $D_{DSHT}=\check{D}_2+[e^T, e^T, e^T, \dots]^T$ wherein $$\check{D}_2 = \frac{\hat{\hat{D}}_2}{\|\hat{\hat{D}}_2\|_{fro}}$$

is a normalized version of $\hat{\hat{D}}_2=UV^T$ with U,V obtained from $$\tilde{D}_1 = USV^T = \text{diag}(q)\frac{\Psi_{DSHT}}{(N+1)^2},$$

with $\Psi_{DSHT}$ being the transposed mode matrix of the spherical harmonics related to the used spherical positions of virtual loudspeakers, and $e^T$ being a transposed version of $$e = -\frac{1_L^T\check{D}_2 - [1, 0, 0, \dots, 0]}{(N+1)^2}.$$

Further, in one embodiment the invention relates to a computer readable storage medium having computer executable instructions that when executed on a computer cause the computer to perform a method for applying Dynamic Range Compression gain factors to a Higher Order Ambisonics (HOA) signal, the method comprising receiving a HOA signal and one or more gain factors, transforming 40 the HOA signal into the spatial domain, wherein an iDSHT is used with a transform matrix obtained from spherical positions of virtual loudspeakers and quadrature gains q, and wherein a transformed HOA signal is obtained, multiplying the gain factors with the transformed HOA signal, wherein a dynamic range compressed transformed HOA signal is obtained, and transforming the dynamic range compressed transformed HOA signal back into the HOA domain being a coefficient domain and using a Discrete Spherical Harmonics Transform (DSHT), wherein a dynamic range compressed HOA signal is obtained. Further, the transform matrix is computed according to $D_{DSHT}=\check{D}_2+[e^T, e^T, e^T, \dots]^T$ wherein $$\check{D}_2 = \frac{\hat{\hat{D}}_2}{\|\hat{\hat{D}}_2\|_{fro}}$$

is a normalized version of $\hat{\hat{D}}_2=UV^T$ with U,V obtained from $$\tilde{D}_1 = USV^T = \text{diag}(q)\frac{\Psi_{DSHT}}{(N+1)^2},$$

with $\Psi_{DSHT}$ being the transposed mode matrix of spherical harmonics related to the used spherical positions of virtual loudspeakers, and $e^T$ being a transposed version of $$e = -\frac{1_L^T\check{D}_2 - [1, 0, 0, \dots, 0]}{(N+1)^2}.$$

Further, in one embodiment the invention relates to a method for performing DRC on a HOA signal, the method comprising steps of setting or determining a mode, the mode being either a simplified mode or a non-simplified mode, in the non-simplified mode, transforming the HOA signal to the spatial domain, wherein an inverse DSHT is used, in the non-simplified mode, analyzing the transformed HOA signal, and in the simplified mode, analyzing the HOA signal, obtaining, from results of said analyzing, one or more gain factors that are usable for dynamic range compression, wherein only one gain factor is obtained in the simplified mode and wherein two or more different gain factors are obtained in the non-simplified mode, in the simplified mode multiplying the obtained gain factor with the HOA signal, wherein a gain compressed HOA signal is obtained, in the non-simplified mode, multiplying the obtained gain factors with the transformed HOA signal, wherein a gain compressed transformed HOA signal is obtained, and transforming the gain compressed transformed HOA signal back into the HOA domain, wherein a gain compressed HOA signal is obtained.

In one embodiment, the method further comprises steps of receiving an indication indicating either a simplified mode or a non-simplified mode, selecting a non-simplified mode if said indication indicates non-simplified mode, and selecting a simplified mode if said indication indicates simplified mode, wherein the steps of transforming the HOA signal into the spatial domain and transforming the dynamic range compressed transformed HOA signal back into the HOA domain are performed only in the non-simplified mode, and wherein in the simplified mode only one gain factor is multiplied with the HOA signal.

In one embodiment, the method further comprises steps of, in the simplified mode analyzing the HOA signal, and in the non-simplified mode analyzing the transformed HOA signal, then obtaining, from results of said analyzing, one or more gain factors that are usable for dynamic range compression, wherein in the non-simplified mode two or more different gain factors are obtained and in the simplified mode only one gain factor is obtained, wherein in the simplified mode a gain compressed HOA signal is obtained by said multiplying the obtained gain factor with the HOA signal, and wherein in the non-simplified mode said gain compressed transformed HOA signal is obtained by multiplying the obtained two or more gain factors with the transformed HOA signal, and wherein in the non-simplified mode said transforming the HOA signal to the spatial domain uses an inverse DSHT.

In one embodiment, the HOA signal is divided into frequency subbands, and the gain factor(s) is (are) obtained and applied to each frequency subband separately, with individual gains per subband. In one embodiment, the steps of analyzing the HOA signal (or transformed HOA signal), obtaining one or more gain factors, multiplying the obtained gain factor(s) with the HOA signal (or transformed HOA signal), and transforming the gain compressed transformed HOA signal back into the HOA domain are applied to each frequency subband separately, with individual gains per subband. It is noted that the sequential order of dividing the HOA signal into frequency subbands and transforming the HOA signal to the spatial domain can be swapped, and/or the sequential order of synthesizing the subbands and transforming the gain compressed transformed HOA signals back into the HOA domain can be swapped, independently from each other.

In one embodiment, the method further comprises, before the step of multiplying the gain factors, a step of transmitting the transformed HOA signal together with the obtained gain factors and the number of these gain factors.

In one embodiment, the transform matrix is computed from a mode matrix $\Psi_{DSHT}$ and corresponding quadrature gains, wherein the mode matrix $\Psi_{DSHT}$ comprises mode vectors according to $\Psi_{DSHT}=[\varphi(\Omega_1), \ldots, \varphi(\Omega_l), \varphi(\Omega_{(N+1)^2})]$ with each $\varphi(\Omega_l)$ being a mode vector containing spherical harmonics of a predefined direction $\Omega_l$ with $\Omega_l=[\theta_l, \phi_l]^T$. The predefined direction depends on a HOA order N.

In one embodiment, the HOA signal B is transformed into the spatial domain to obtain a transformed HOA signal $W_{DSHT}$, and the transformed HOA signal $W_{DSHT}$ is multiplied with the gain values diag(g) sample wise according to $W_{DSHT}=\text{diag}(g)\, D_L B$, and the method comprises a further step of transforming the transformed HOA signal to a different second spatial domain according to $W_2=\hat{D}\, W_{DSHT}$, where $\hat{D}$ is pre-calculated in an initialization phase according to $\hat{D}=D\, D_L^{-1}$ and where D is a rendering matrix that transforms a HOA signal into the different second spatial domain.

In one embodiment, at least if $(N+1)^2<\tau$, with N being the HOA order and $\tau$ being a DRC block size, the method further comprises steps of transforming 53 the gain vector to the HOA domain according to $G=D_L^{-1}\,\text{diag}(g)\, D_L$, with G being a gain matrix and DL being a DSHT matrix defining said DSHT, and applying the gain matrix G to the HOA coefficients of the HOA signal B according to $B_{DRC}=GB$, wherein the DRC compressed HOA signal $B_{DRC}$ is obtained.

In one embodiment, at least if $L<\tau$, with L being the number of output channels and $\tau$ being a DRC block size, the method further comprises steps of applying the gain matrix G to the renderer matrix D according to $\hat{D}=DG$, wherein a dynamic range compressed renderer matrix $\hat{D}$ is obtained, and rendering the HOA signal with the dynamic range compressed renderer matrix.

In one embodiment the invention relates to a method for applying DRC gain factors to a HOA signal, the method comprising steps of receiving a HOA signal together with an indication and one or more gain factors, the indication indicating either a simplified mode or a non-simplified mode, wherein only one gain factor is received if the indication indicates the simplified mode, selecting either a simplified mode or a non-simplified mode according to said indication, in the simplified mode multiplying the gain factor with the HOA signal, wherein a dynamic range compressed HOA signal is obtained, and in the non-simplified mode transforming the HOA signal into the spatial domain, wherein a transformed HOA signal is obtained, multiplying the gain factors with the transformed HOA signals, wherein dynamic range compressed transformed HOA signals are obtained, and transforming the dynamic range compressed transformed HOA signals back into the HOA domain, wherein a dynamic range compressed HOA signal is obtained.

Further, in one embodiment the invention relates to a device for performing DRC on a HOA signal, the device comprising a processor or one or more processing elements adapted for setting or determining a mode, the mode being either a simplified mode or a non-simplified mode, in the non-simplified mode transforming the HOA signal to the spatial domain, wherein an inverse DSHT is used, in the non-simplified mode analyzing the transformed HOA signal, while in the simplified mode analyzing the HOA signal, obtaining, from results of said analyzing, one or more gain factors that are usable for dynamic range compression, wherein only one gain factor is obtained in the simplified mode and wherein two or more different gain factors are obtained in the non-simplified mode, in the simplified mode multiplying the obtained gain factor with the HOA signal, wherein a gain compressed HOA signal is obtained, and in the non-simplified mode multiplying the obtained gain factors with the transformed HOA signal, wherein a gain compressed transformed HOA signal is obtained, and transforming the gain compressed transformed HOA signal back into the HOA domain, wherein a gain compressed HOA signal is obtained.

In one embodiment for non-simplified mode only, a device for performing DRC on a HOA signal comprises a processor or one or more processing elements adapted for transforming the HOA signal to the spatial domain, analyzing the transformed HOA signal, obtaining, from results of said analyzing, gain factors that are usable for dynamic range compression, multiplying the obtained factors with the transformed HOA signals, wherein gain compressed transformed HOA signals are obtained, and transforming the gain compressed transformed HOA signals back into the HOA domain, wherein gain compressed HOA signals are obtained. In one embodiment, the device further comprises a transmission unit for transmitting, before multiplying the obtained gain factor or gain factors, the HOA signal together with the obtained gain factor or gain factors.

Also, here it is noted that the sequential order of dividing the HOA signal into frequency subbands and transforming the HOA signal to the spatial domain can be swapped, and the sequential order of synthesizing the subbands and transforming the gain compressed transformed HOA signals back into the HOA domain can be swapped, independently from each other.

Further, in one embodiment the invention relates to a device for applying DRC gain factors to a HOA signal, the device comprising a processor or one or more processing elements adapted for receiving a HOA signal together with an indication and one or more gain factors, the indication indicating either a simplified mode or a non-simplified mode, wherein only one gain factor is received if the indication indicates the simplified mode, setting the device to either a simplified mode or a non-simplified mode, according to said indication, in the simplified mode, multiplying the gain factor with the HOA signal, wherein a dynamic range compressed HOA signal is obtained; and in the non-simplified mode, transforming the HOA signal into the spatial domain, wherein a transformed HOA signal is obtained, multiplying the gain factors with the transformed HOA signals, wherein dynamic range compressed transformed HOA signals are obtained, and transforming the dynamic range compressed transformed HOA signals back into the HOA domain, wherein a dynamic range compressed HOA signal is obtained.

In one embodiment, the device further comprises a transmission unit for transmitting, before multiplying the obtained factors, the HOA signals together with the obtained gain factors. In one embodiment, the HOA signal is divided into frequency subbands, and the analyzing the transformed HOA signal, obtaining gain factors, multiplying the obtained factors with the transformed HOA signals and transforming the gain compressed transformed HOA signals back into the HOA domain are applied to each frequency subband separately, with individual gains per subband.

In one embodiment of the device for applying DRC gain factors to a HOA signal, the HOA signal is divided into a plurality of frequency subbands, and obtaining one or more gain factors, multiplying the obtained gain factors with the HOA signals or the transformed HOA signals, and in the non-simplified mode transforming the gain compressed transformed HOA signals back into the HOA domain are applied to each frequency subband separately, with individual gains per subband.

Further, in one embodiment where only the non-simplified mode is used, the invention relates to a device for applying DRC gain factors to a HOA signal, the device comprising a processor or one or more processing elements adapted for receiving a HOA signal together with gain factors, transforming the HOA signal into the spatial domain (using iDSHT), wherein a transformed HOA signal is obtained, multiplying the gain factors with the transformed HOA signal, wherein a dynamic range compressed transformed HOA signal is obtained, and transforming the dynamic range compressed transformed HOA signal back into the HOA domain (i.e. coefficient domain) (using DSHT), wherein a dynamic range compressed HOA signal is obtained.

The following tables Tab. 4-6 list spherical positions of virtual loudspeakers for HOA of order N with N=4, 5 or 6.

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

It will be understood that the present invention has been described purely by way of example, and modifications of detail can be made without departing from the scope of the invention. Each feature disclosed in the description and (where appropriate) the claims and drawings may be provided independently or in any appropriate combination. Features may, where appropriate be implemented in hardware, software, or a combination of the two.

REFERENCES

[1] "Integration nodes for the sphere", Jörg Fliege 2010, online accessed 2010-10-05 http://-www.mathematik.uni-dortmund.de/lsx/research/projects/fliege/nodes/nodes.html

[2] "A two-stage approach for computing cubature formulae for the sphere", Jörg Fliege and Ulrike Maier, Technical report, Fachbereich Mathematik, Universität Dortmund, 1999

TABLE 4

Spherical positions of virtual loudspeakers for HOA order N = 4
N = 4 Positions

| Inclination\rad | Azimuth\rad | Gain $g_l$ |
|---|---|---|
| 1.57079633 | 0.00000000 | 0.52689274 |
| 2.39401407 | 0.00000000 | 0.48518011 |
| 1.14059283 | −1.75618245 | 0.52688432 |
| 1.33721851 | 0.69215601 | 0.47027816 |
| 1.72512898 | −1.33340585 | 0.48037442 |
| 1.17406779 | −0.79850952 | 0.51130478 |
| 0.69042674 | 1.07623171 | 0.50662254 |
| 1.47478735 | 1.43953896 | 0.52158458 |
| 1.67073876 | 2.25235428 | 0.52835300 |
| 2.52745842 | −1.33179653 | 0.52388165 |

TABLE 4-continued

Spherical positions of virtual loudspeakers for HOA order N = 4
N = 4 Positions

| Inclination\rad | Azimuth\rad | Gain $g_l$ |
|---|---|---|
| 1.81037110 | 3.05783641 | 0.49800736 |
| 1.91827560 | −2.03351312 | 0.48516540 |
| 0.27992161 | 2.55302196 | 0.50663531 |
| 0.47981675 | −1.18580204 | 0.50824199 |
| 2.37644317 | 2.52383590 | 0.45807408 |
| 0.98508365 | 2.03459671 | 0.47260252 |
| 2.18924206 | 1.58232601 | 0.49801422 |
| 1.49441825 | −2.58932194 | 0.51745117 |
| 2.04428895 | 0.76615262 | 0.51744164 |
| 2.43923726 | −2.63989327 | 0.52146074 |
| 1.10308418 | 2.88498471 | 0.52158484 |
| 0.78489181 | −2.54224201 | 0.47027748 |
| 2.96802845 | 1.25258904 | 0.52145388 |
| 1.91816652 | −0.63874484 | 0.48036020 |
| 0.80829458 | −0.00991977 | 0.50824345 |

TABLE 5

Spherical positions of virtual loudspeakers for HOA orders N = 5
N = 5 Positions

| Inclination\rad | Azimuth\rad | Gain $g_l$ |
|---|---|---|
| 1.57079633 | 0.00000000 | 0.34493574 |
| 2.68749293 | 3.14159265 | 0.35131373 |
| 1.92461621 | −1.22481468 | 0.35358151 |
| 1.95917092 | 3.06534485 | 0.36442231 |
| 2.18883411 | 0.08893301 | 0.36437350 |
| 0.35664531 | −2.15475973 | 0.33953855 |
| 1.32915731 | −1.05408340 | 0.35358417 |
| 2.21829206 | 2.45308518 | 0.33534647 |
| 1.00903070 | 2.31872053 | 0.34739607 |
| 0.99455136 | −2.29370294 | 0.36437101 |
| 1.13601102 | −0.46303195 | 0.33534542 |
| 0.41863640 | 0.63541391 | 0.35131934 |
| 1.78596913 | −0.56826765 | 0.34739591 |
| 0.56658255 | −0.66284593 | 0.36441956 |
| 2.25292410 | 0.89044754 | 0.36437098 |
| 2.67263757 | −1.71236120 | 0.36442208 |
| 0.86753981 | −1.50749854 | 0.34068122 |
| 1.38158330 | 1.72190554 | 0.35358401 |
| 0.98578154 | 0.23428465 | 0.35131950 |
| 1.45079827 | −1.69748851 | 0.34739437 |
| 2.09223697 | −1.85025366 | 0.33534659 |
| 2.62854417 | 1.70110685 | 0.34494256 |
| 1.44817433 | −2.83400771 | 0.33953463 |
| 2.37827410 | −0.72817212 | 0.34068529 |
| 0.82285875 | 1.51124182 | 0.33534531 |
| 0.40679748 | 2.38217051 | 0.34493552 |
| 0.84332549 | −3.07860398 | 0.36437337 |
| 1.38947809 | 2.83246237 | 0.34068522 |
| 1.61795773 | −2.27837285 | 0.34494274 |
| 2.17389505 | −2.58540735 | 0.35131361 |
| 1.65172710 | 2.28105193 | 0.35358166 |
| 1.67862104 | 0.57097606 | 0.33953819 |
| 2.02514031 | 1.70739195 | 0.34739443 |
| 1.12965858 | 0.89802542 | 0.36442004 |
| 2.82979093 | 0.17840931 | 0.33953488 |
| 1.67550339 | 1.18664952 | 0.34068114 |
| 0.32919895 | 2.78993083 | 0.26169552 |
| 1.06225899 | 1.49243160 | 0.25534085 |
| 1.06225899 | 1.49243160 | 0.25534085 |
| 1.01526896 | −2.16495206 | 0.25092628 |
| 1.10570423 | −1.59180661 | 0.25099550 |
| 1.47319543 | 1.14258135 | 0.26160776 |
| 2.15414541 | 1.88359269 | 0.24442720 |
| 0.20805372 | −0.52863458 | 0.25487678 |
| 0.50141101 | −2.11057110 | 0.25619096 |
| 1.98041218 | 0.28912378 | 0.26288225 |
| 0.83752075 | −2.81667891 | 0.25837996 |
| 2.44130228 | 0.81495962 | 0.26772416 |

TABLE 5-continued

| Spherical positions of virtual loudspeakers for HOA orders N = 5 N = 5 Positions | | |
|---|---|---|
| Inclination\rad | Azimuth\rad | Gain $q_l$ |
| 1.21539727 | −1.00788022 | 0.25534092 |
| 2.62944184 | −1.58354086 | 0.26437874 |
| 1.86884674 | −2.40686906 | 0.25619091 |
| 0.68705554 | −1.20612227 | 0.25576026 |
| 1.52325470 | −1.98940871 | 0.26169551 |
| 2.39097364 | −2.37336381 | 0.25576025 |
| 0.98667678 | 0.86446728 | 0.26014219 |
| 2.27078506 | −3.06771779 | 0.25099551 |
| 2.33605400 | 2.51674567 | 0.26455002 |
| 1.29371004 | 2.03656562 | 0.25576032 |
| 0.86334494 | 2.77720222 | 0.25092620 |
| 1.94118355 | −0.37820559 | 0.26772409 |
| 2.10323413 | −1.28283816 | 0.24442725 |
| 1.87416330 | 0.80785741 | 0.23821179 |
| 1.63423157 | 1.65277986 | 0.26437876 |
| 2.06477636 | 1.31341296 | 0.25595469 |
| 0.82305807 | −0.47771423 | 0.26437883 |
| 2.04154780 | −1.85106655 | 0.25487677 |
| 0.61285067 | 0.33640173 | 0.24442716 |
| 1.08029340 | 0.10986230 | 0.25595472 |
| 1.60164764 | −1.43535015 | 0.26455000 |
| 2.66513701 | 1.69643796 | 0.26014228 |
| 1.35887781 | −2.58083733 | 0.25838000 |
| 1.78658555 | 2.25563014 | 0.25487674 |
| 1.83333508 | 2.80487382 | 0.26169549 |
| 0.78406009 | 2.08860099 | 0.25099560 |
| 2.94031615 | −0.07888534 | 0.26160780 |
| 1.34658213 | 2.57400947 | 0.25619094 |
| 1.73906669 | −0.87744928 | 0.26014223 |
| 0.50210739 | 1.33550547 | 0.26455007 |
| 2.38040297 | −0.75104092 | 0.25595462 |
| 1.41826790 | 0.54845193 | 0.26772418 |
| 1.77904107 | −2.93136138 | 0.25092628 |
| 1.35746628 | −0.47759398 | 0.26160765 |
| 1.31545731 | 3.12752832 | 0.25838016 |
| 2.81487011 | −3.12843671 | 0.25534100 |

TABLE 6

| Spherical positions of virtual loudspeakers for HOA orders N = 6 N = 6 Positions | | |
|---|---|---|
| Inclination\rad | Azimuth\rad | Gain $q_l$ |
| 1.57079633 | 0.00000000 | 0.23821170 |
| 2.42144792 | 0.00000000 | 0.23821175 |

What is claimed is:

1. A method for dynamic range compression (DRC), the method comprising:

receiving a reconstructed Higher Order Ambisonics (HOA) audio signal representation;

transforming the reconstructed HOA audio signal into a spatial domain based on:

$W_{DSHT}=D_{DSHT}C$, wherein $D_{DSHT}$ is an inverse Discrete Spherical Harmonics Transform (DSHT) matrix, wherein Cis a block of $\tau$ HOA samples, and wherein Wis a block of spatial samples matching an input time granularity of a Quadrature Mirror Filter (QMF) bank;

applying a DRC gain value g(n, m) corresponding to a time frequency tile (n, m) based on:

$\check{w}_{DRC}(n, m)=\text{diag}(g(n, m))\,\hat{w}_{DSHT}(n, m)$, wherein $\hat{w}_{DSHT}(n, m)$ is a vector of spatial channels for the time frequency tile (n, m); and rendering to loudspeaker channels based on:

$w(n, m)=D\,D_{DSHT}^{-1}\,\check{w}_{DRC}(n, m)$, wherein $D_{DSHT}^{-1}$ matrix is an inverse of the $D_{DSHT}$ matrix and D is a HOA rendering matrix, wherein the $D_{DSHT}^{-1}$ and the $D_{DSHT}$ matrices are optimized for DRC purposes based on a row-vector e is calculated by $$e = -\frac{1_L^T\check{D}_2 - [1, 0, 0, \ldots, 0]}{(N+1)^2}$$

and a matrix $\check{D}_2$, where [1,0,0, . . . ,0] is a row vector of $(N+1)^2$ all zero elements except for a first element with a value of one, wherein N is an HOA order, wherein $$\check{D}_2 = \frac{\hat{D}_2}{\|\hat{D}_2\|_{fro}},$$

wherein a compact singular value decomposition is performed $\tilde{D}_1=USV^T$ and a new prototype matrix is calculated by: $\hat{\tilde{D}}_2=UV^T$, wherein $$\tilde{D}_1 = \text{diag}(q)\frac{\Psi^{\square}_{DSHT}}{(N+1)^2},$$

wherein a set of spherical positions $\mathfrak{D}_{DSHT}=[\Omega_1,\Omega_l, \ldots ,\Omega)_{(N+1)^2}]$ with $\Omega_l=[\theta_l, \phi_l]^T$ and related quadrature (cubature) gains $q \in \mathbb{R}^{(N+1)^2\times 1}$ are selected and wherein a mode matrix $\Psi_{DSHT}$ is related to the spherical positions.

2. An apparatus for dynamic range compression (DRC), the apparatus comprising:

a receiver for receiving a reconstructed Higher Order Ambisonics (HOA) audio signal representation;

an audio decoder configured to:

transform the reconstructed HOA audio signal into a spatial domain based on:

$W_{DSHT}=D_{DSHT}C$, wherein $D_{DSHT}$ is an inverse Discrete Spherical Harmonics Transform (DSHT) matrix, wherein Cis a block of $\tau$ HOA samples, and wherein W is a block of spatial samples matching an input time granularity of a Quadrature Mirror Filter (QMF) bank;

apply a DRC gain value g(n, m) corresponding to a time frequency tile (n, m) based on:

$\check{w}_{DRC}(n, m)=\text{diag}(g(n, m))\,\hat{w}_{DSHT}(n, m)$, wherein $\hat{w}_{DSHT}$ (n, m) is a vector of spatial channels for the time frequency tile (n, m); and rendering to loudspeaker channels based on $w(n, m)=D\,D_{DSHT}^{-1}\,\check{w}_{DRC}(n, m)$, wherein $D_{DSHT}^{-1}$ matrix is an inverse of the $D_{DSHT}$ matrix and D is a HOA rendering matrix, wherein the $D_{DSHT}^{-1}$ and the $D_{DSHT}$ matrices are optimized for DRC purposes based on a row-vector e is calculated by $$e = -\frac{1_L^T\check{D}_2 - [1, 0, 0, \ldots, 0]}{(N+1)^2}$$

and a matrix $\check{D}_2$, where [1,0,0, . . . ,0] is a row vector of $(N+1)^2$ all zero elements except for a first element with a value of one, wherein N is an HOA order, wherein $$\check{D}_2 = \frac{\tilde{\tilde{D}}_2}{\|\tilde{\tilde{D}}_2\|_{fro}},$$

wherein a compact singular value decomposition is performed $\tilde{D}_1 = USV^T$ and a new prototype matrix is calculated by: $\tilde{\tilde{D}}_2 = UV^T$, wherein $$\tilde{D}_1 = \mathrm{diag}(q)\frac{\Psi_{DSHT}^{\square}}{(N+1)^2},$$

wherein a set of spherical positions $\mathfrak{D}_{DSHT} = [\Omega_1, \Omega_l, \ldots, \Omega)_{N+1)}{}^2]$ with $\Omega_l = [\theta_l, \phi_l]^T$ and related quadrature (cubature) gains $q \in \mathbb{R}^{(N+1)^2 \times 1}$ are selected and wherein a mode matrix $\Psi_{DSHT}$ is related to the spherical positions.

3. A non-transitory computer readable storage medium having computer executable instructions that when executed on a computer cause the computer to perform the method of claim 1.

* * * * *